US005253091A

United States Patent [19]

Kimura et al.

[11] Patent Number: 5,253,091

[45] Date of Patent: Oct. 12, 1993

[54] LIQUID CRYSTAL DISPLAY HAVING REDUCED FLICKER

[75] Inventors: Shinichi Kimura, Sagamihara; Hiroshi Suzuki; Hidefumi Yamaguchi, both of Fujisawa, all of Japan

[73] Assignee: International Business Machines Corporation, Armonk, N.Y.

[21] Appl. No.: 727,199

[22] Filed: Jul. 9, 1991

[30] Foreign Application Priority Data

Jul. 9, 1990 [JP] Japan .................................. 2-179728

[51] Int. Cl.[5] ........................ G02F 1/133; G09G 3/36

[52] U.S. Cl. ........................................ 359/55; 359/57; 345/87

[58] Field of Search ........................ 359/54, 55, 57, 66, 359/84, 85, 86; 340/702, 703, 765, 784; 358/236

[56] References Cited

U.S. PATENT DOCUMENTS

| | | | |
|---|---|---|---|
| 4,773,737 | 9/1988 | Yokono et al. | 359/68 |
| 4,791,415 | 12/1988 | Takahashi | 359/55 |
| 4,822,142 | 4/1989 | Yasui | 359/85 |
| 5,107,353 | 4/1992 | Okumura | 359/55 |

FOREIGN PATENT DOCUMENTS

| | | | |
|---|---|---|---|
| 0151615 | 8/1985 | Japan | 359/57 |
| 0275822 | 12/1986 | Japan | 359/57 |
| 0275823 | 12/1986 | Japan | 359/55 |
| 0275824 | 12/1986 | Japan | 359/55 |
| 0275825 | 12/1986 | Japan | 359/55 |
| 0023023 | 1/1987 | Japan | 359/57 |
| 0071932 | 4/1987 | Japan | 359/57 |

OTHER PUBLICATIONS

"New Driving Method For Liquid Crystal Display" The IBM Technical Disclosure Bulletin-vol. 30-No. 12-May 1988-pp. 7-8.

*Primary Examiner*—William L. Sikes
*Assistant Examiner*—Tai V. Duong
*Attorney, Agent, or Firm*—David Aker

[57] ABSTRACT

A liquid crystal display and a method of operating the display. A plurality of row conductors and a plurality of column conductors control pixels arranged in a matrix of rows and columns. A driver circuit applies a first data signal to first column conductors and a second data signal to second column conductors. The first and second column conductors are adjacent alternate conductors in a row direction of the matrix. The polarity of the first and second data signals are opposite to each other. Pixels in a row may be connected to the same row conductor while pixels in each column are alternately connected, respectively, to one column conductor to which the first data signal is applied and to one column conductor to which the second data signal is applied. The pixels in each row may be alternately connected respectively to one of two adjacent row conductors. The polarity of the first and second data signals is held constant for a cycle time which is substantially equal to a frame time of the liquid crystal display.

8 Claims, 6 Drawing Sheets

LIQUID CRYSTAL DISPLAY HAVING REDUCED FLICKER

TECHNICAL FIELD

This invention relates to active matrix liquid crystal displays using thin film transistors (TFT) as switching elements. More particularly, it relates to flicker reduction in such liquid crystal displays.

BACKGROUND ART

In the past, liquid crystal displays using active matrix type liquid crystal panels included liquid crystal elements driven with alternating current (AC) by inverting the polarity of the applied data signals. This served to prevent deterioration of the liquid crystal elements. However, this caused noticeable screen flicker because all pixels were driven with the same polarity during the same frame. In these displays, in order to prevent flicker, the polarity of the two AC signals applied, respectively, to the adjacent pixels on every gate line and every data line are inverted.

FIG. 1 schematically illustrates the configuration of the liquid crystal panel of these conventional active matrix type liquid crystal displays. FIGS. 2 and 3 show drive waveforms which are applied to the liquid crystal panel of FIG. 1. In FIG. 1, the gate drive circuit 1 is connected to n lines of the row signal conductors G1 to Gn, and it sequentially supplies the drive waveform outputs shown in FIGS. 2*a*, 2*b*, and 3*a* to the row signal conductors G1 to Gn. A first data drive circuit 2 is connected to the odd numbered column signal conductors D1 to Dm−1, and supplies thereto the drive waveform outputs shown in FIGS. 2*c* and 3*c*. A second data drive circuit 3 is connected to the even numbered column signal conductors D2 to Dm, and it supplies to these lines the drive waveform outputs shown in FIGS. 2*c* and 3*c*. Thin film transistors 4 are placed at each point of crossing of the row and column conductors, with their gate and drain electrodes being connected, respectively, to row and column signal conductors, and their source electrodes being connected to pixels 5 as described below. Each pixel 5 is a liquid crystal cell, driven by its respective TFT 4.

The operation of the circuit of FIG. 1, using the drive waveforms of FIGS. 2 and 3, is as follows. First, the gate signals VGn and VGn+1 shown in FIGS. 2*a* and 2*b*, are applied sequentially to the gate electrodes of the respective TFT's 4 that are connected to the associated row signal conductor. This causes the row of TFT's 4 to be turned on. In synchronization with these gate signals, the data signals shown in FIG. 2*c* are sent by the first and second data drive circuits 2 and 3, and n pixels 5 connected to each column conductor are driven alternately with positive and negative polarity signals for every gate pulse applied to the row signal conductors. Thus, screen flicker is reduced. But m pixels 5 connected to the row signal conductors are not driven alternately each gate pulse as the aforementioned n number of pixels 5. Thus, flicker is not eliminated. To reduce flicker on pixels associated with every row signal conductor, the application of the first data signal VDm shown in FIG. 3*b* from the first data drive circuit 2 to the odd numbered column conductors, and the application of the second data signal VDm+1 shown in FIG. 3*c* from the second data drive circuit 3 to even numbered column conductors are synchronized with the output of the gate signal VGn shown in FIG. 3*a* from the gate drive circuit 1. Thus, the n pixels and the m pixels connected to each row and each column signal conductor, respectively, are driven alternately with positive and negative polarity. Flicker between each pixel is reduced.

Thus, in these conventional liquid crystal displays, as described above, the polarity of the voltage applied to the adjacent pixels on every row and column signal conductor is inverted in order to reduce screen flicker. However, the polarity reversal at every column signal conductor requires a high repetition frequency data signal, as shown in FIGS. 3*b* and 3*c*, thereby causing a high electric power consumption problem in the data drive circuit.

If an attempt is made to utilize a data signal having a high frequency and amplitude without reducing the output resistance of the data drive circuit, the output signal of the data drive circuit is considerably weakened. This affects the display data. Of course the output resistance of the data drive circuit can be reduced by enlarging the size of the output transistors. Accordingly, to avoid affecting the display data, the output resistance of the data drive circuit may be reduced, but this inevitably enlarges the chip size of the drive circuit, resulting in high cost.

SUMMARY OF THE INVENTION

It is an object of the invention to provide a liquid crystal display with reduced screen flicker.

It is another object of the invention to solve this problem without increasing the cost of the data drive circuit of the liquid crystal display.

It is yet another object of the invention to provide a flicker-free display without increasing electric power consumption.

In accordance with the invention, a liquid crystal display comprises a plurality of row conductors, a plurality of column conductors, and a plurality of pixels arranged in a matrix; and means for applying a first data signal to one column conductor and for applying a second data signal to an adjacent column conductor, the polarity of the first data signal and that of the second data signal being opposite to each other. The connections of a respective TFT to the column and row signal conductors which drive each one of the plurality of pixels are arranged in a matrix and are different for every pixel, so that adjacent pixels are driven with signals of opposite polarity. In other words, by varying the connections of the TFT's to the row signal conductors and to the column signal conductors every other pixel, and by shifting the phase of the signal between the adjacent pixels, screen flicker is reduced.

DETAILED DESCRIPTION OF THE PREFERRED EMBODIMENTS

Figure 1:
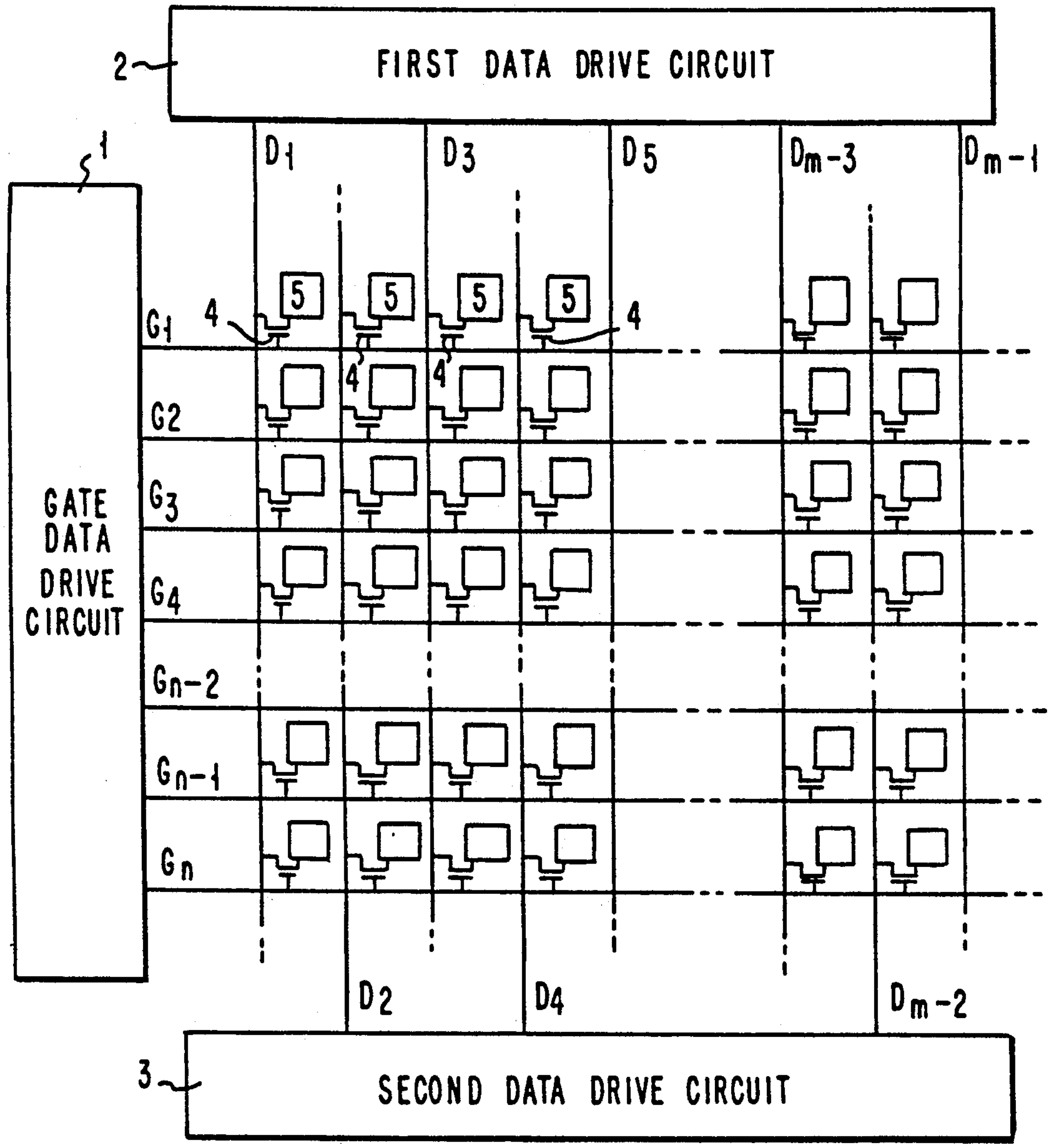
FIG. 1 PRIOR ART
FIG. 1 is a schematic diagram of a conventional liquid crystal display panel.
Figure 4:
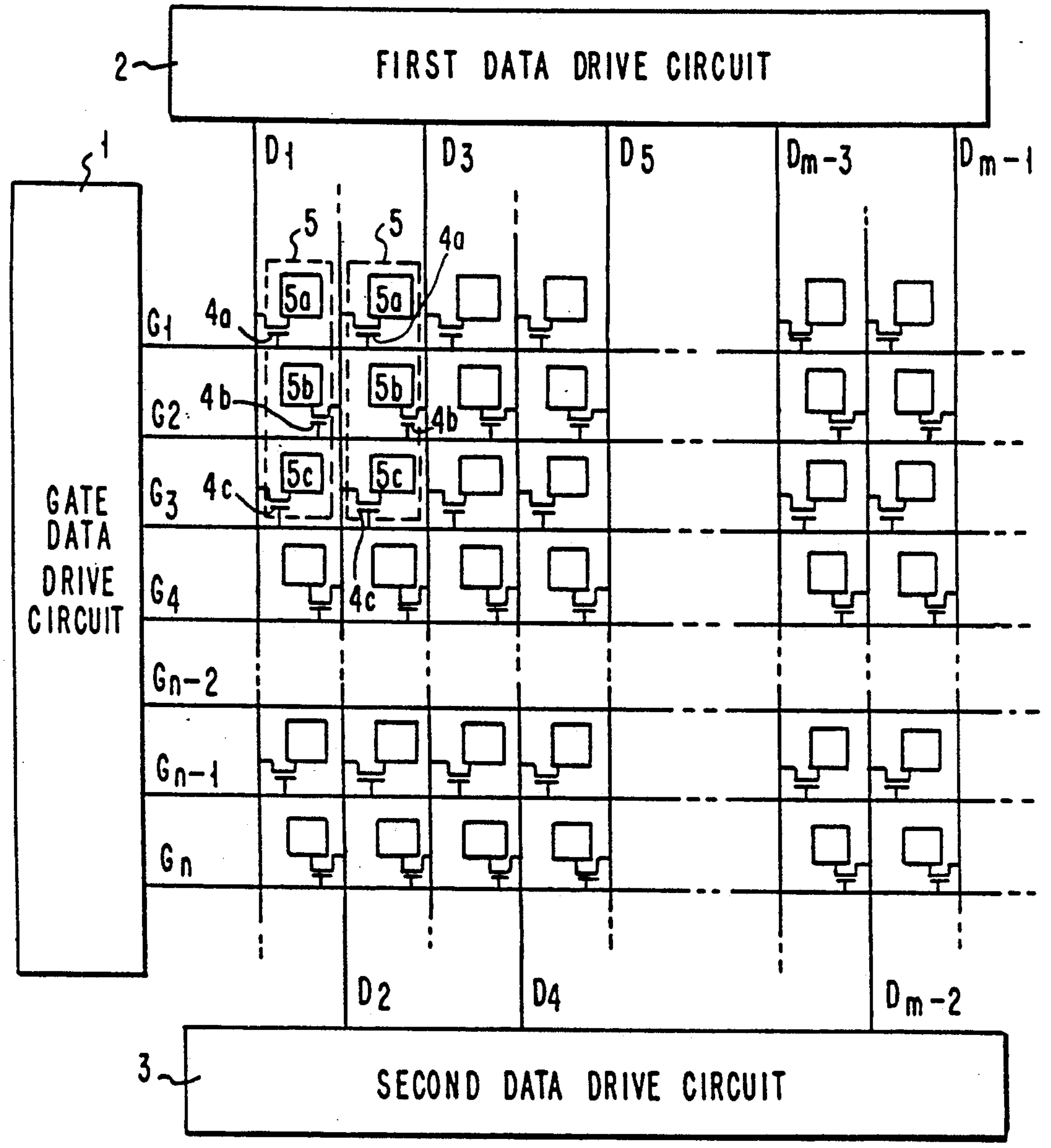
FIG. 4 is an schematic diagram of a liquid crystal display panel according to a first embodiment of the invention.
Figure 5:
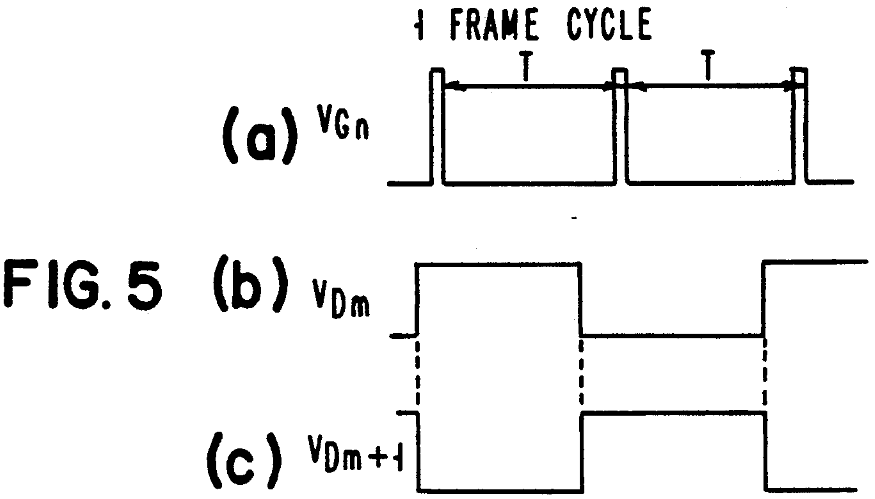
FIGS. 5*a*, 5*b* and 5*c* are waveform charts of signals applied to a liquid crystal display panel in accordance with the invention.

Reference is made to FIG. 4 and to the drive waveforms associated therewith and illustrated in FIG. 5. In FIG. 4, gate drive circuit 1 is connected to n lines of the row signal conductors G1 to Gn, and supplies the gate signal Gn shown in FIG. 5a as described below. A first data drive circuit 2 is connected to the odd numbered signal conductors D1 to Dm−1, and provides the first data signal VDm shown in FIG. 5b. A second data drive circuit 3 is connected to the even numbered signal conductors D2 to Dm (the last one not being shown), and provides the second data signal VDm+1 shown in FIG. 5c. As is apparent from FIG. 5, the polarity of the first data signal VDm, is opposite to the polarity of the second data signal VDm+1. Each gate electrode of the TFT's 4a, 4b, 4c . . . which drive respectively the pixels 5a, 5b, and 5c . . . is connected to its respective row signal conductor. The drain electrodes of TFT's in each row as well as in each column are alternately connected to one of the odd numbered signal conductors D1 to Dm−1, and to one of the even numbered signal conductors D2 to Dm. Further, each source electrode of the TFT's 4a, 4b, 4c . . . is connected to a respective one of the pixels 5a, 5b, 5c . . . The pixels 5a, 5b, and 5c are liquid crystal cells that respectively display the three primary colors: red, green, and blue; and these three pixels 5a, 5b, and 5c form one color unit pixel 5. The gate electrodes of each TFT that drive each pixel in the same row are all connected to a signal conductor of that row.

The method of driving the liquid crystal display in accordance with the first embodiment of the invention is described with reference to the drive waveforms illustrated in FIG. 5. First, the gate signal VGn shown in FIG. 5a is applied sequentially to the row signal conductors G1 to Gn from the gate drive circuit 1. All TFT's 4 connected to a row which is driven are turned on. Each row is activated sequentially. Synchronously with the application of the gate signal, during a frame cycle T, the first data signal VDm (FIG. 5b) from the first data drive circuit 2 and the second data signal VDm+1 (FIG. 5c) from second data drive circuit 3 are applied to the odd and even numbered column conductors, respectively. In this manner, the screen flicker is reduced as each pixel 5a, 5b, 5c . . . receives a data signal wherein the phase is shifted by 180 degrees between the adjacent pixels. This is true for adjacent pixels in successive rows, as well as for adjacent pixels in successive columns. In accordance with the invention, the data signal may be a wide or relatively long duration pulse signal as shown in FIG. 5a, so that it is unnecessary to raise the operating frequency of the data drive circuit as is the case for conventional TFT liquid crystal displays.

Figure 6:
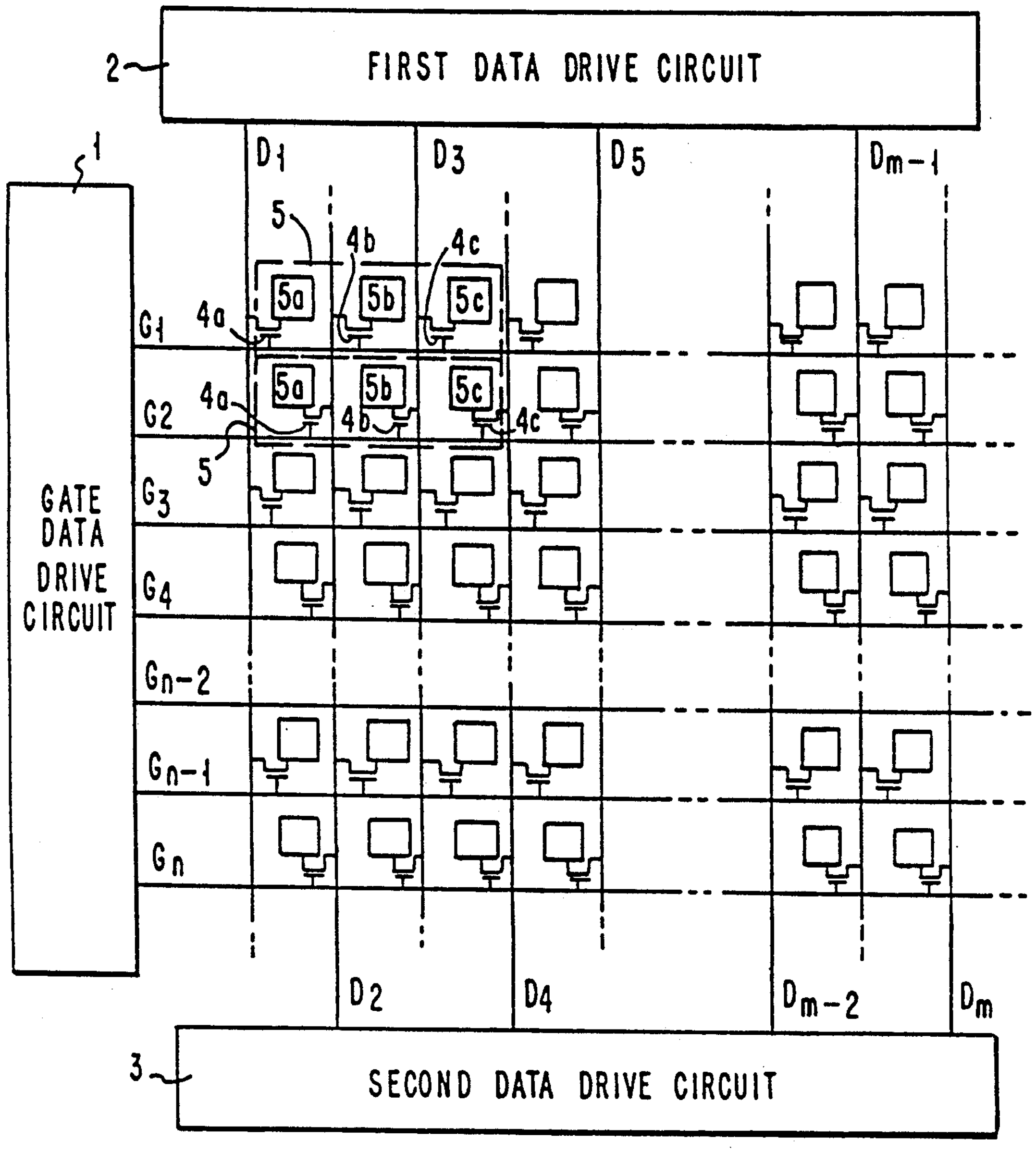
FIGS. 6, 7, and 8 are schematic diagrams of liquid crystal display panels in accordance with other embodiments of the invention.

In a second embodiment of the invention illustrated in FIG. 6, the pixels 5a, 5b, 5c in a row are used respectively to display the three primary colors, red, green, and blue, and form color unit pixel 5. The connections of the row and column signal conductors of the TFT's 4 which drive each pixel are the same as in FIG. 4. The method of driving each pixel on the liquid crystal panel is also the same as in FIG. 4. Thus, screen flicker is reduced.

Figure 2:
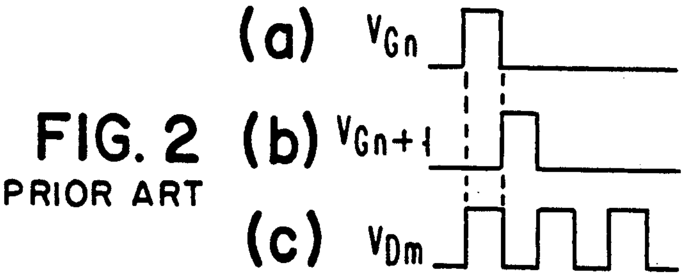
FIG. 2 PRIOR ART
FIGS. 2*a*, 2*b*, 2*c*, 3*a*, 3*b* and 3*c* represent the waveforms of the signals that are applied to the liquid crystal display panel of FIG. 1.
Figure 3:
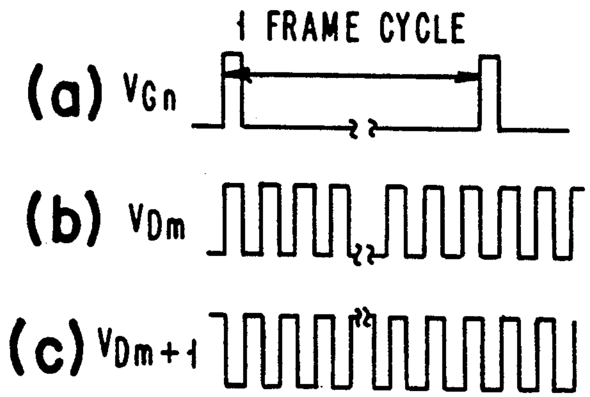
FIG. 3 PRIOR ART
Figure 7:
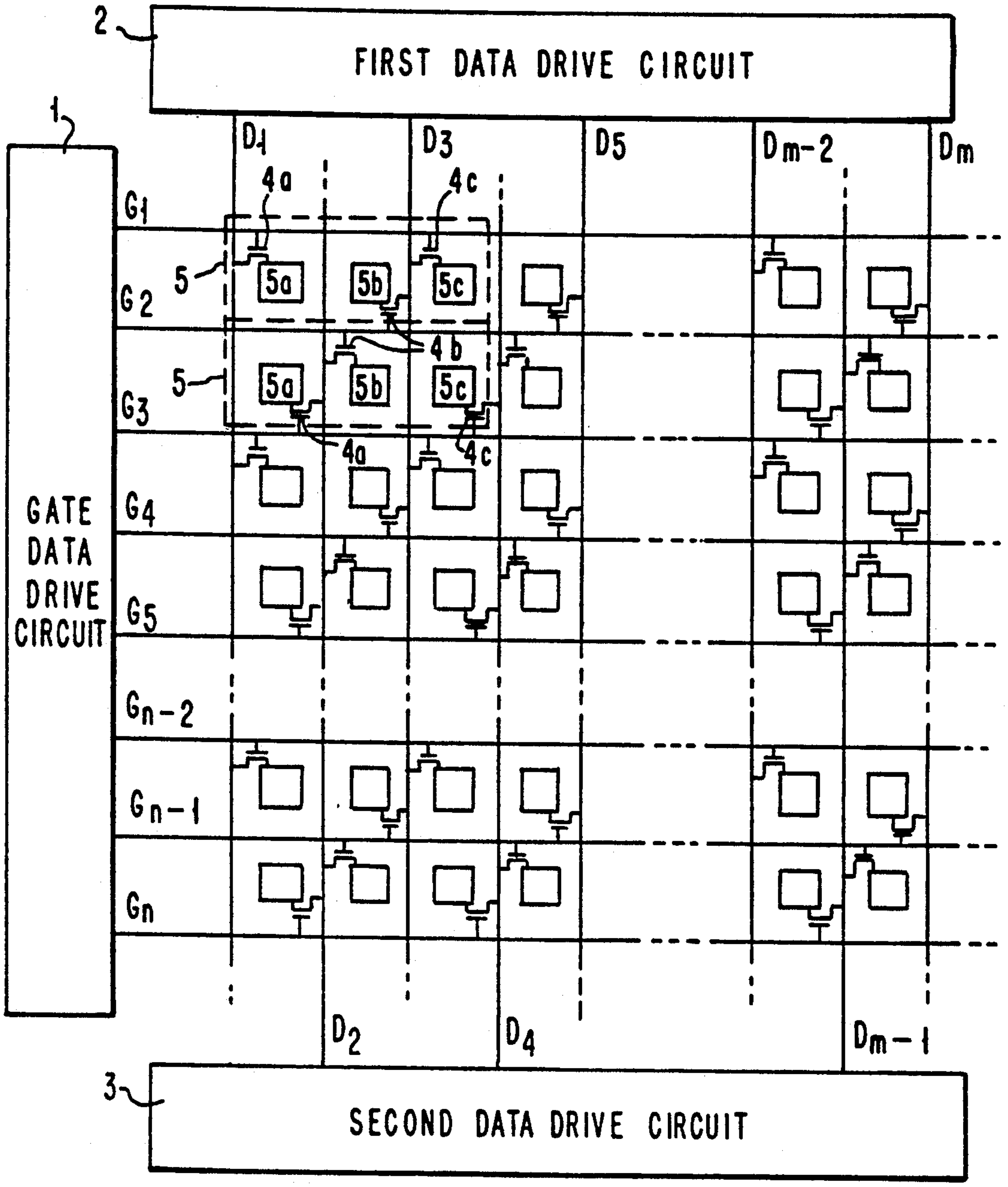

FIG. 7 illustrates a schematic configuration according to a further embodiment of the invention. The connections of the row and column signal conductors of FIG. 2 are modified, so that successive gate electrodes of the TFT's 4a, 4b, 4c . . . which each drive a successive, respective pixel 5a, 5b, 5c . . . in the direction of the row are alternately connected to one of the two adjacent row signal conductors. All drain electrodes of the TFT's 4a, 4b, 4c . . . in a given row are connected to the column signal conductors of only one of the data drive circuits. However, the drain electrodes of TFT's in successive rows are alternately connected to the column signal conductors of the first data drive circuit 2 and the column signal conductors of the second data drive circuit 3. In this case, the method of driving includes the application of the drive waveform in the manner shown in FIG. 5 to each pixel, to drive successive pixels in the direction of the row with the same polarity, and to drive successive pixels in the direction of the column alternately with positive and negative polarities; that is when one pixel is driven by a positive data signal an adjacent pixel in the direction of a column is driven by a negative data signal. Thus, flicker in the direction of the column is reduced.

Figure 8:
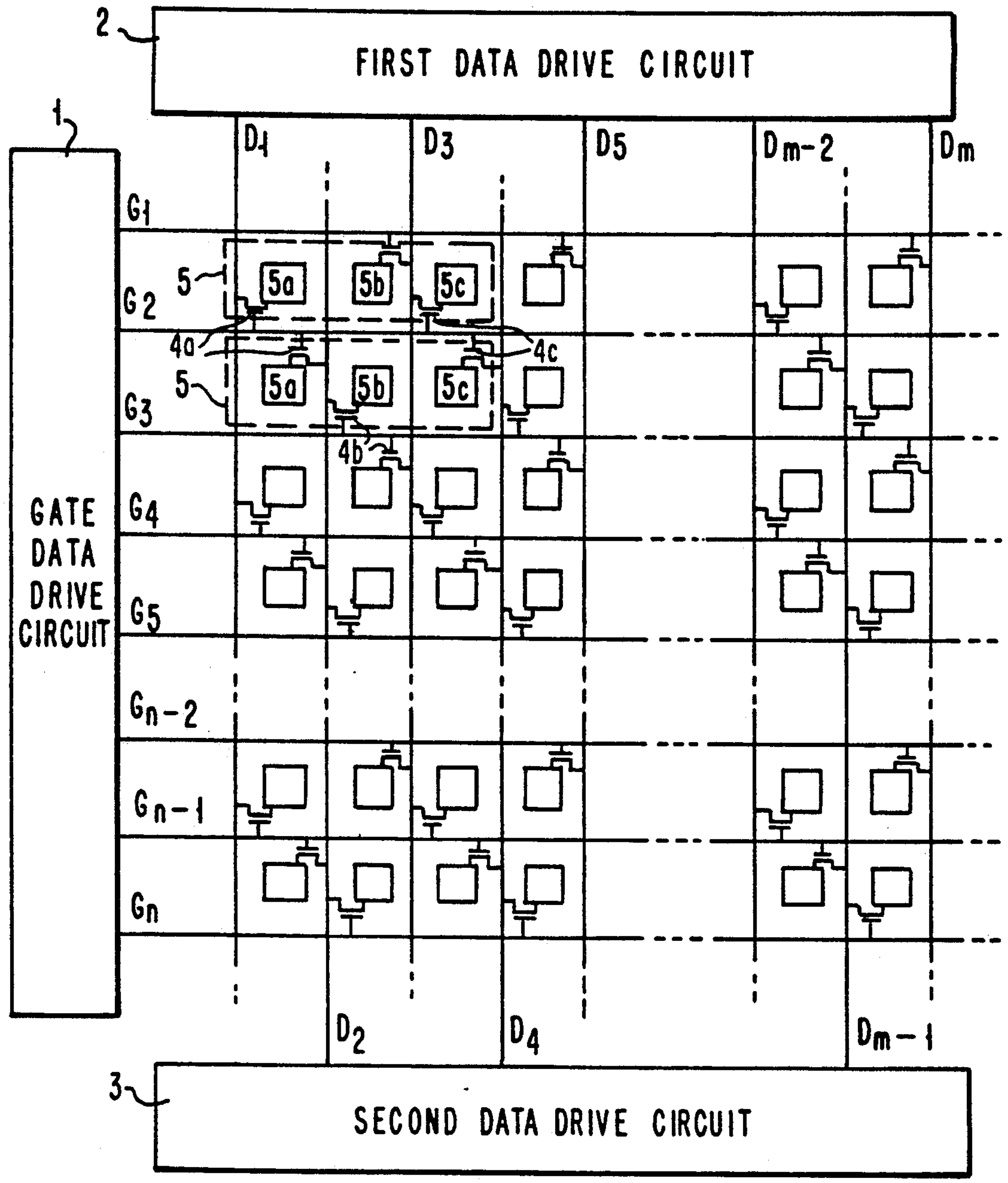

A modification of the configuration of FIG. 7 is shown in FIG. 8 where the connections of the TFT's 4a, 4b, 4c . . . have been changed. The gates of successive TFT's in a row are each connected alternately to one of two adjacent row signal conductors. The drains of successive TFT's in a column are each connected alternately to one of two adjacent column signal conductors. In this embodiment, flicker is reduced to the same degree as in the embodiment of FIG. 7.

Thus, in accordance with the invention, the connections of the row and column signal conductors to the TFT's which drive the pixels (and between the adjacent pixels), is changed. Each pixel width is driven with opposite polarity to an adjacent pixel. Therefore, screen flicker is reduced, less electrical power is consumed, and the cost of the display is reduced because a smaller chip size integrated circuit driver can be used.

We claim:

1. A liquid crystal display comprising:
   - a plurality of row conductors;
   - a plurality of column conductors;
   - a plurality of pixels arranged in a matrix of rows and columns;
   - a driver means for applying a first data signal to first column conductors, and for applying a second data signal to second column conductors, said first column conductors and said second column conductors being adjacent alternate column conductors in a row direction of said matrix, polarity of said first and second data signals being opposite to each other; pixels in a row being connected to the same row conductor; and pixels in each column being alternately connected respectively to one column conductor to which said first data signal is applied, and to one column conductor to which said second data signal is applied, wherein the polarity of said first and second data signals are held constant for a cycle time which is substantially equal to a frame cycle of said liquid crystal display.

2. A liquid crystal display as in claim 1, wherein said pixel includes a thin film transistor and a pixel electrode connected to said thin film transistor.

3. a liquid crystal display comprising:
   - a plurality of row conductors;

a plurality of column conductors;

a plurality of pixels arranged in a matrix of rows and columns;

a driver means for applying a first data signal to first column conductors and for applying a second data signal to second column conductors, said first column conductors and said second column conductors being adjacent alternate column conductors in a row direction of said matrix, polarity of said first and second data signals being opposite to each other; pixels in each row being alternately connected to one of two adjacent row conductors; and pixels in each column being alternately connected respectively to one column conductor to which said first data signal is applied and to one column conductor to which said second data signal is applied.

4. A liquid crystal display as in claim 3, wherein the polarity of said first and second data signals are held constant for a cycle time which is substantially equal to a frame cycle of said liquid crystal display.

5. A liquid crystal display as in claim 3, wherein said pixel includes a thin film transistor and a pixel electrode connected to said thin film transistor.

6. A method for driving a liquid crystal display comprising a plurality of row conductors; a plurality of column conductors; a plurality of pixels arranged in a matrix of rows and columns; and means for applying a first data signal to first of said column conductors, and for applying a second data signal to second of said column conductors, the improvement comprising:

selecting polarity of said first and second data signals to be opposite to each other, arranging said first column conductors and said second column conductors to be adjacent alternate column conductors in a row direction of said matrix, and connecting the pixels so that pixels in the same row are connected to the same row conductor; and pixels in each column are alternately connected respectively to one first column conductor to which said first data signal is applied, and to one second column conductor to which said second data signal is applied; the polarity of said first and second data signals being held constant for a time substantially equal to a frame cycle of said liquid crystal display.

7. A method for driving a liquid crystal display comprising a plurality of row conductors; a plurality of column conductors; a plurality of pixels arranged in a matrix of rows and columns; and means for applying a first data signal to first of said column conductors and for applying a second data signal to second of said column conductors, the improvement comprising:

selecting polarity of said first and second data signals to be opposite to each other; arranging said first column conductors and said second column conductors to be adjacent alternate column conductors in a row direction of said matrix, and connecting said pixels so that pixels in each row are alternately connected respectively to one of two adjacent row conductors; and said pixels in each column are alternately connected respectively to one first column conductor to which said first data signal is applied and to one second column conductor to which said second data signal is applied.

8. A method as in claim 7, wherein the polarity of said first and second data signals is held constant for a time substantially identical to a frame cycle of said liquid crystal display.

* * * * *